Jan. 20, 1959  C. E. BAGGOTT ET AL  2,869,655
TREE HOE
Filed July 10, 1956  2 Sheets-Sheet 1
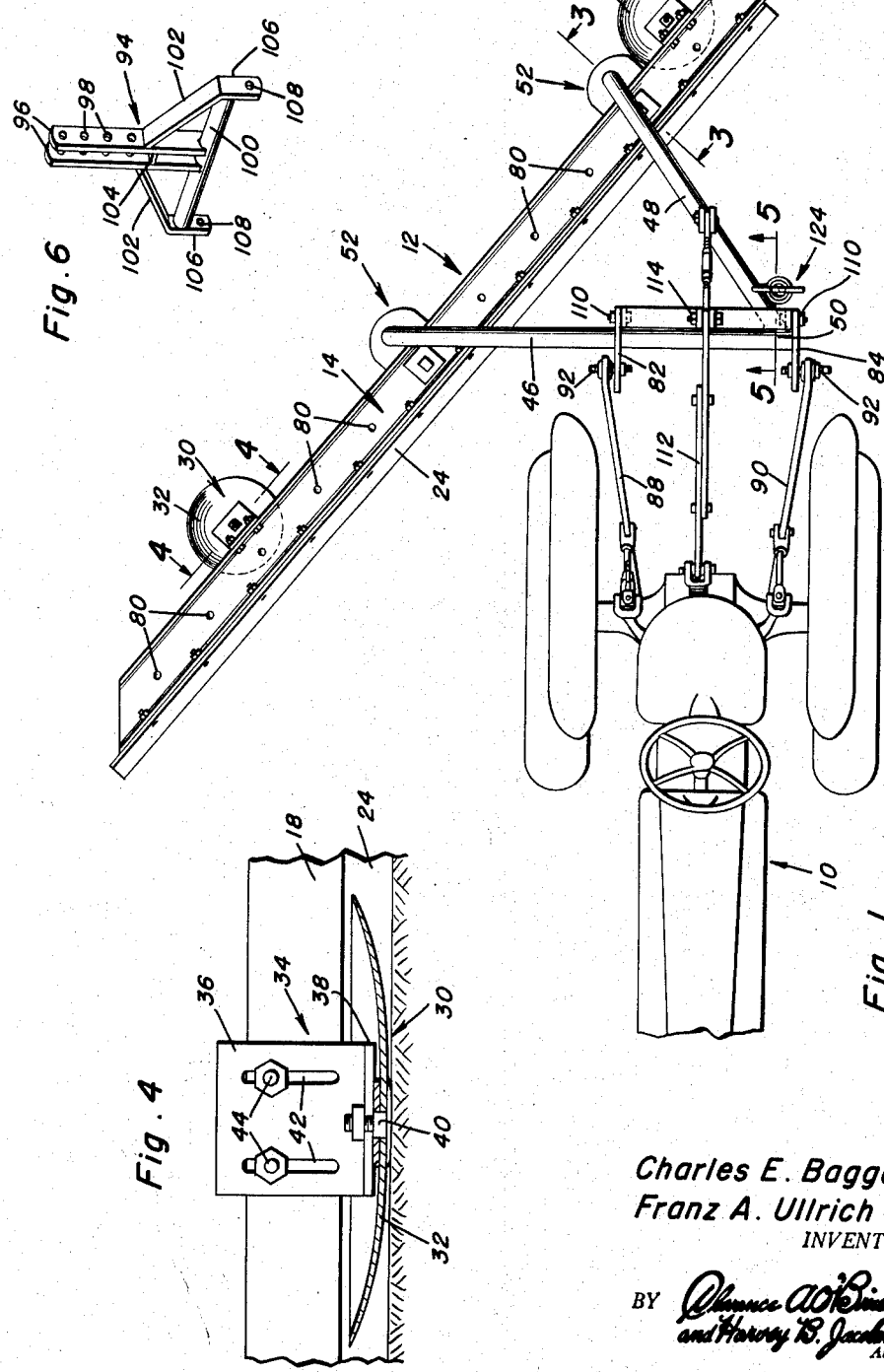
Charles E. Baggott
Franz A. Ullrich
INVENTORS.
BY
Attorneys Jan. 20, 1959 C. E. BAGGOTT ET AL 2,869,655
TREE HOE
Filed July 10, 1956
2 Sheets-Sheet 2
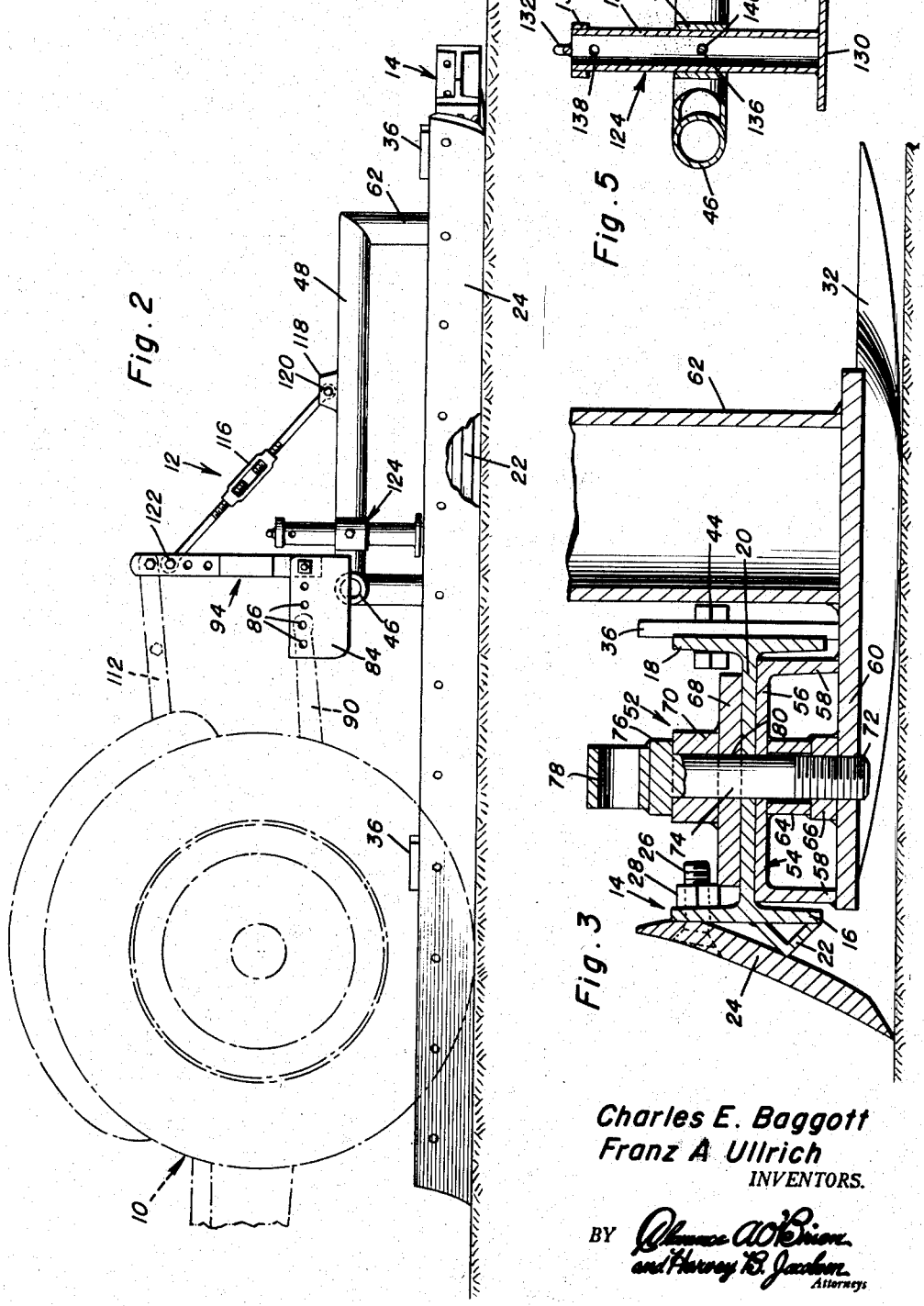
Charles E. Baggott
Franz A. Ullrich
INVENTORS.

United States Patent Office 2,869,655
Patented Jan. 20, 1959

2,869,655

TREE HOE

Charles E. Baggott and Franz A. Ullrich, Wauchula, Fla.

Application July 10, 1956, Serial No. 596,914

2 Claims. (Cl. 172—387)

This invention relates in general to new and useful improvements in agricultural implements, and more specifically to an improved tree hoe.

In order to properly care for trees, particularly citrus and other orchard trees, it is necessary that weeds surrounding the trunk of the tree be removed and surplus earth spread out. However, many orchard trees are of such a nature whereby the limbs thereof hang relatively close to the ground so as to prevent the use of ordinary farm implements for accomplishing the weeding and scraping operation.

It is therefore the primary object of this invention to provide an improved hoe which may be mounted on a tractor in such a manner so as to project to one side of the tractor so that the hoe may be run beneath the limbs of the tree while the tractor runs clear of the limbs.

Another object of this invention is to provide an improved hoe for use in conjunction with trees, the hoe being in the form of an elongated blade disposed at one side of and at an angle to the longitudinal axis of the tractor, there being provided suitable support means on the hoe for connecting the hoe to the lift mechanism of the tractor whereby the hoe may be selectively lifted for transportation or placed into engagement with the ground for performing the desired hoeing operation.

A further object of this invention is to provide an improved hoe construction, the hoe including a frame member in the form of a structural member, there being secured to the structural member along a forward edge thereof a ground engaging blade, the rear part of the structural member being provided with suitable skids to position the blade relative to the ground, and there being provided suitable means for connecting the hoe to a tractor for movement thereby.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary plan view of a tractor and shows mounted on the tractor the tree hoe which is the subject of this invention;

Figure 2 is a side elevational view of the hoe of Figure 1 with the rear part of the tractor being shown in phantom lines, portions of the hoe being broken away and shown in section for purposes of clarity;

Figure 3 is an enlarged fragmentary sectional view taken substantially upon the plane indicated by section line 3—3 of Figure 1 and shows the manner in which a support arm is secured to the frame member of the hoe;

Figure 4 is an enlarged fragmentary sectional view taken substantially upon the plane indicated by section line 4—4 of Figure 1 and shows the manner in which a skid is adjustably secured to the frame member of the hoe;

Figure 5 is an enlarged fragmentary sectional view taken substantially upon the plane indicated by the section line 5—5 of Figure 1 and shows the details of a support stand for the hoe; and Figure 6 is a perspective view of a hitch adaptor used for connecting the hoe to the hitch assembly of the tractor.

Referring now to the drawings in detail, it will be seen that there is illustrated in Figure 1 a conventional type of farm tractor which is referred to in general by the reference numeral 10. Secured to the farm tractor 10 is the tree hoe which is the subject of this invention, the tree hoe being referred to in general by the reference numeral 12 and having the major portion thereof extending outwardly to one side of the tractor 10 and at an angle to the longitudinal axis of the tractor 10.

The tree hoe 12 includes an elongated frame member 14 which is in the form of an eye section. The frame member 14 includes a forward vertical flange 16, a rear vertical flange 18 and a horizontal web 20, the web 20 extending between and connecting the flanges 16 and 18. It is to be noted that the frame member 14 extends substantially the full length of the main part of the tree hoe 12.

Welded to the lower part of the forward flange 16 on the front face thereof is an angle member 22, as is best illustrated in Figure 3. Clamped against the upper part of the forward face of the forward flange 16 is an elongated blade 24 which extends substantially the full length of the frame member 14, as is best illustrated in Figure 1. The blade 24 is secured to the flange 16 by means of bolts 26 which are bent during their application, the bolts 26 being retained in place by nuts 28.

The frame member 14 is supported with respect to the ground by means of a pair of skids 30. Each of the skids 30 includes a circular outline dished member 32 which is carried by a mounting bracket referred to in general by reference numeral 34. The mounting bracket 34 includes a vertical flange 36 and a horizontal flange 38. The dished member 32 underlies the horizontal flange 38 and is secured thereto against rotation by a bolt assembly 40.

The vertical flange 36 is provided with a pair of vertical slots 42 through which there are passed fasteners 44. The fasteners 44 secure the mounting bracket 34 to the rear flange 18. By vertically adjusting the mounting bracket 34, the skids 30 may be vertically adjusted so as to control the depth of cut by the blade 24.

In order that the frame member 14 may be suitably secured to the tractor 10, there is provided a transverse support arm 46 and a rearwardly extending support arm 48. The forward end of the support arm 48 is connected to an inner end of the support arm 46 as at 50. The support arms 46 and 48 are secured to the frame member 14 by means of identical connecting means 52, the connecting means 52 being best illustrated in Figure 3.

Referring now to Figure 3 in particular, it will be seen that the connecting means 52 includes an inverted channel-shaped member 54 which has an upper web 56 and depending flanges 58. Secured to the flanges 58, which depend below the flanges 16 and 18 and the frame member 14, is a rearwardly extending support plate 60. Secured to the support plate 60 rearwardly of the frame member 14 is a vertical portion 62 of the support arm 48. The support arm 46 has a similar vertical portion which will be suitably secured to a like support plate of its connecting means.

Secured to the underside of the web 56 is a sleeve 64 which in turn has secured thereto a nut 66. The nut 66 is secured to the support plate 60.

Overlying the web 20 is a small plate 68 carrying a sleeve 70. Extending downwardly through the sleeve 70, through the plate 68, the web 20, the web 56 and the sleeve 64 is a bolt having a threaded portion 72 threadedly engaged in the nut 66, the bolt being referred to by the reference numeral 74. The bolt 74 has a head 76 on which there is secured a horizontal sleeve 78 for receiving a pin or the like whereby the bolt 74 may be rapidly turned for removal.

It is to be noted that the web 20 on the frame member 14 is provided with a plurality of apertures 80 for receiving the bolt 74. Thus the support arms 46 and 48 may be adjustably secured to the frame member 14 to vary the amount which it extends outwardly from the tractor 10.

Secured to the upper part of the support arm 46 is a pair of plates 82 and 84. The plates 82 and 84 are identical and each is provided with a plurality of apertures 86. Extending rearwardly from the tractor 10 is a pair of power lift arms 88 and 90 which are connected to the plates 82 and 84, respectively, by fasteners 92 passed through the apertures 86.

Referring now to Figure 6 in particular, it will be seen that there is illustrated a hitch adapter which is referred to in general by the reference numeral 94. The hitch adapter 94 includes a pair of vertical straps 96 which have vertically spaced apertures 98 formed therein. The lower ends of the straps 96 are secured to the horizontal member 100. Extending upwardly from the outer ends of the horizontal member 100 are braces 102 whose upper ends are secured to the straps 96 intermediate their ends. The straps 96 are connected together adjacent their connections to the braces 102 by a connector 104. The braces 102 have extensions 106 which are secured to the ends of the member 100 and extend down therethrough. The extensions 106 are provided with apertures 108.

The hitch adapter 94 is adjustably secured to the support arm 46 by means of bolts 110 passing through the apertures 108 and being selectively received in the apertures 86 of the plates 82 and 84.

The tractor 10 also includes an upper control arm 112 which is of an adjustable length. The control arm 112 is adjustably secured to the hitch adapter 94 by means of a bolt 114 selectively received in the apertures 98.

The tree hoe 12 also includes an adjustable brace 116 which extends between the support arm 48 and the hitch adapter 94. One end of the adjustable brace 116 is connected to the support arm 48 by means of an ear 118 on the support arm 48 and a fastener 120 passing through the ear. The opposite end of the brace 116 is adjustably secured to the hitch adapter 94 by means of a fastener 122, passing through selected ones of the apertures 98.

Although only certain ones of the apertures 98 and 86 are utilized, it is to be understood that it is highly desirable that the support frame 14 be retained in a horizontal position both when lowered and when raised in order that the ends thereof will not dig into the ground. Inasmuch as the hitch on various tractors will vary, by providing the numerous apertures 86 and 98, the frame member 14 may be so mounted on the tractor 10 whereby it will remain parallel to the ground.

By properly positioning the frame member 14 with respect to the tractor 10, the operator of the tractor 10 may drive down between trees of an orchard clear of the limbs of the trees and still work the ground beneath the trees. This is due primarily because the blade 24 extends outwardly of the tractor 10 and to one side thereof. The blade 24 may be set to merely skim the earth or, if desired, may be set to make a heavy cut.

In order to facilitate the coupling of the tree hoe 12 to the tractor 10, there is carried by the support arm 48 a jack stand which is referred to in general by the reference numeral 124. The jack stand 124 includes a sleeve 126 which is welded to the support arm 48. Slidably received in the sleeve 126 is a standard 128 having a ground engageable base 130. A lifting eye 132 is provided at the upper end of the standard 128. The upper end of the standard 128 is also provided with a collar 134 to limit the downward movement thereof through the sleeve 126.

The standard 128 is provided with a lower aperture 136 and an upper aperture 138. When the jack stand 124 is not in use, a pin 140 is passed through the sleeve 126 and into the aperture 136 to retain the base 130 above the ground. On the other hand, when the jack stand 124 is to be used, the pin 140 is removed and the standard 128 is permitted to slide downwardly through the sleeve 126 so that the base 130 engages the ground. The pin 140 is then passed through the sleeve 126 and into the aperture 138. It is to be understood that the length of the standard 128 is such so as to retain the tree hoe in a normal horizontal position which it normally occupies when set upon the ground through the lift mechanism of the tractor 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hoe attachment for a tractor for working ground beneath overhanging branches of trees, said hoe attachment comprising an elongated frame member, skids secured to said frame member for supporting said frame member relative to the ground, said frame member having a forward edge, a scraper blade secured to said frame member and extending along said forward edge, support means carried by said frame member for securing said frame member to a tractor hitch, said frame member being in the form of a structural section having a forward vertical flange, a rear vertical flange and a horizontal web, said skids being secured to said rear flange, said blade being secured to said forward flange, said support means being secured to said web, said support means comprising a pair of support arms connected together in a V-arrangement, a hitch adapter assembly on said support arms, and connecting means releasably securing said support arms to said frame member.

2. A hoe attachment for a tractor for working ground beneath overhanging branches of trees, said hoe attachment comprising an elongated frame member, skids secured to said frame member for supporting said frame relative to the ground, said frame member having a forward edge, a scraper blade secured to said frame member and extending along said forward edge, support means carried by said frame member for securing said frame member to a tractor hitch, said frame member being in the form of a structural section having a forward vertical flange, a rear vertical flange and a horizontal web, said skids being secured to said rear flange, said blade being secured to said forward flange, said support means being secured to said web, said support means comprising a pair of support arms connected together in a V-arrangement, a hitch adapter assembly on said support arms, and connecting means releasably securing said support arms to said frame member, said connecting means including an inverted channel member seated in the under part of said structural member and releasably secured to said web.

References Cited in the file of this patent

UNITED STATES PATENTS

| 505,506 | Butt | Sept. 26, 1893 |
| 1,698,809 | Angell | Jan. 15, 1929 |
| 1,857,479 | Royer | May 10, 1932 |
| 1,968,412 | Lull | July 31, 1934 |
| 2,055,291 | Henry | Sept. 22, 1936 |
| 2,125,134 | Thompson | July 26, 1938 |
| 2,527,613 | Zagurski | Oct. 31, 1950 |